United States Patent

Thompson

[11] 3,882,088
[45] May 6, 1975

[54] POLYESTERS BEARING POLYETHYLENIMINE TERMINAL GROUPS

[75] Inventor: Darrell R. Thompson, Somerville, N.J.

[73] Assignee: E. I. du Pont de Nemours & Company, Wilmington, Del.

[22] Filed: Apr. 5, 1972

[21] Appl. No.: 241,401

Related U.S. Application Data

[63] Continuation-in-part of Ser. No. 776,822, Nov. 18, 1968, abandoned, and Ser. No. 120,770, March 3, 1971, abandoned.

[52] U.S. Cl. ..... 260/75 N; 106/308 M; 260/78.3 R; 260/471 C; 260/473 R; 260/475 P; 260/823; 260/860
[51] Int. Cl............................................. C08g 17/14
[58] Field of Search ........ 260/78.3, 75 N, 823, 860, 260/471 C, 473 R, 475 P

[56] References Cited
UNITED STATES PATENTS

| | | | |
|---|---|---|---|
| 2,977,385 | 3/1961 | Fowler et al. | 260/475 |
| 3,169,945 | 2/1965 | Hostettler et al. | 260/78.3 |
| 3,375,231 | 3/1968 | Fukui et al. | 260/78.3 |
| 3,730,807 | 5/1973 | Smith et al. | 156/331 |

*Primary Examiner*—Morris Liebman
*Assistant Examiner*—E. A. Nielsen

[57] ABSTRACT

Polyesters represented by the general structure

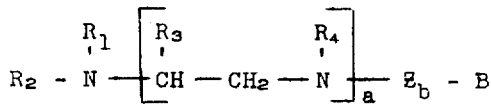

useful as film-formers in coating compositions.

3 Claims, No Drawings

POLYESTERS BEARING POLYETHYLENIMINE TERMINAL GROUPS

CROSS-REFERENCE TO RELATED APPLICATIONS

This application is a continuation-in-part of application Ser. No. 776,822, filed Nov. 18, 1968, now abandoned, and application Ser. No. 120,770, filed Mar. 3, 1971, also abandoned.

STATEMENT OF THE INVENTION

This invention relates to polyesters. It is more particularly directed to polyesters represented by the structure

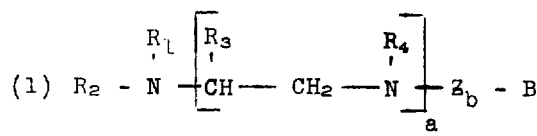

where
- $R_1$, $R_2$ and $R_4$ can be hydrogen, alkyl radicals of 1 through 4 carbon atoms, $-CH_2CH_2NH_2$, or $-CH_2CH_2OH$;
- $R_3$ can be hydrogen or an alkyl radical of 1 through 4 carbon atoms;
- $Z_b$ can be a divalent organic linking radical;
- B can be a polyester or copolyester segment, number average molecular weight 500–50,000, preferably 1000–20,000;
- $a$ can be a number 1 through 2000; and
- $b$ can be 0 or 1.

UTILITY

The polymers of the invention are useful as filmformers in coating compositions, particularly when combined with a second polymer having complementary reactive groups. Illustrative of such second polymers are heat reactive phenolics, polyglycidyl ethers and esters, polyisocyanate resins, butylated urea/formaldehyde resins and melamine/formaldehyde/alkanol resins.

The polymers of the invention can be used as filmformers by mixing from about 55 to about 95 parts of the polymer with from about 5 to 45 parts of the second complementary polymer, in a suitable solvent. This solution can then be used directly to give clear coatings or it may be pigmented as desired.

The coating composition can be applied conventionally and preferably is then baked for from about 10 to 30 minutes at 80°–200°C.

The polymers of the invention are also useful as aids for dispersing solid particles in organic liquids. They are especially useful as aids for dispersing pigments in organic liquids. Illustrative of the pigments which can be dispersed are titanium dioxide, carbon black, zinc oxide, lead titanate, potassium titanate, antimony oxide, lithopone, phthalocyanine blue, toluidine red, quinacridone and the like.

Pigment dispersions made with polymers of the invention are remarkably resistant to flocculation, which gives the paints into which the dispersions are incorporated higher initial gloss, better hiding and tinting strength, and makes them resistant to color drift and gloss loss. These pigment dispersions can also be used satisfactorily with many more diverse types of paints than conventional pigment dispersions. Moreover, a dispersion made with a polymer of the invention can have a significantly higher pigment content, while retaining the same degree of fluidity, than when conventional aids are used.

The polymers of the invention can be used as pigment dispersing aids by dissolving from 0.001 to about 2.00 grams of polymer per square meter[1] of surface of the pigment to be used, preferably 0.004 to about 0.100 gram per square meter, in an organic liquid compatible with the paint into which the pigment dispersion is to be incorporated. Illustrative of organic liquids which can be used are aliphatic and aromatic hydrocarbons, ethers, esters, ketones, alcohols, and mixtures of these.

[1] Measured by the Brunauer, Emmett and Teller nitrogen adsorption method described on page 30 of "Colloidal Dispersions" by Earl K. Fischer, published by John Wiley and Sons in 1950.

An appropriate amount of pigment is then added to this solution which is then subjected to shear, as by sandgrinding or ball-milling, to deagglomerate and disperse the pigment. This pigment dispersion or mill-base can be then added directly to a paint.

Polymers of the invention preferred for use as pigment dispersing aids are those of formula (1) where B is a polycaprolactone segment, or a segment of a copolyester of an aliphatic diacid or aromatic diacid and ethylene glycol. Especially preferred are those whose preparation is shown in Examples 2–6.

The polymers of the invention are also useful for dispersing magnetic oxides such as iron oxide or chromium dioxide in compositions used to prepare magnetic tape. Use of 0.5–10 percent, by weight of such a composition, of a polymer of the invention promotes wetting of the oxide, improves adhesion of the composition to the tape substrate and improves the tape's magnetic properties. The polymer of Example 3(I) is preferred for this use.

The polymers of the invention can also be used to disperse pigments and dyes in fiber-forming polymers. They are especially useful in dispersing carbon black in polyesters, where they minimize filter clogging and enhance fiber color. The polymers of Examples 3(I) and 6 are preferred for this use.

PREPARATION OF THE POLYMERS

Preparation of the polymers of the invention can be more easily shown if it is first explained that structurally the polymer molecule divides itself naturally into two or three segments.

The first of these, the B segment, is derived from a polyester or a copolyester.

The second, the $-Z_b-$ segment, is a divalent organic linking radical (which may be absent) which serves only to link the other two segments of the molecule together.

The third, the

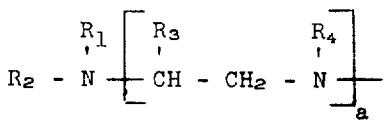

segment, is derived from a polyethylenimine.

The precursors of these segments are separately prepared and then linked together by reacting them under

A. Preparation of the Polyester

This precursor can be prepared by any of the well-known polyester-forming reactions. Illustrative of these 1. Polymerization of lactones such as propiolactone, caprolactone and pivalolactone.
2. Condensation of hydroxy acids such as $\alpha,\omega$-hydroxypropionic acid, $\alpha,\omega$-hydroxydecanoic acid and 12-hydroxystearic acid.
3. Condensation of glycol and dicarboxylic acid systems such as ethylene glycol/decamethylene dicarboxylic acid, hexamethylene glycol/succinic acid and 2,2-bishydroxymethylpropane/adipic acid.
4. The formation of polyesters capped at both ends with hydroxyl groups should be minimized. This can be done by controlling the stoichiometry of the reaction so that the acid number and the hydroxyl number of the polyester are approximately equal.
5. Polymerization of epoxides with cyclic acid anhydrides in the presence of excess epoxides.
6. Condensing a diol and a mixture of diacids or diesters, a diacid and a mixture of diols, or a mixture of diols and a mixture of diacids or diesters.

These reactions, as well as others, are described in later detail in "Preparative Methods of Polymer Chemistry", Sorenson and Campbell, Interscience Publishers, Inc. New York, N.Y. (1961), pp. 111–127 and 242–247 and "Polyesters and Their Applications" Bjorksten Research Laboratories, Inc. Reinhold Publishing Corp., New York, N.Y. (1956).

B. Preparation of the Polyethylenimine Segment

Some of the polyethylenimines are available commercially and can be used directly, without processing. Those polyethylenimines which cannot be obtained commercially can be prepared according to the general equation

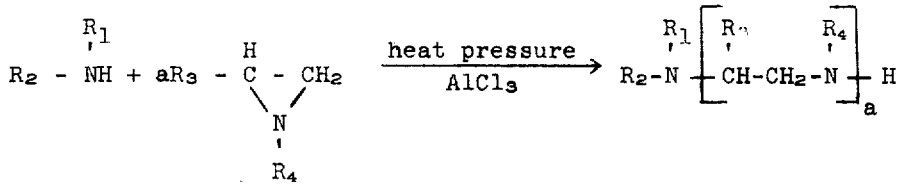

where $R_1$, $R_2$, $R_3$, $R_4$ and $a$ are as in formula (1).

C. Linking the Polyester to the Polyethylenimine

The polymers of the invention are made by coupling together the previously prepared polyester and polyethylenimine. If the terminal functional group on the polyester can react directly with the polyethylenimine, they can be coupled together by simply mixing stoichiometric amounts of each in a vessel and then heating them at a temperature of 0° to 120°C. for from ½ to 4 hours.

If the functional group on the polyester cannot react directly with the polyethylenimine, either may be modified by reacting it with a stoichiometric amount of an appropriate difunctional compound so that it will react. Preferably the polyester is so modified.

Illustrative of such a reaction (which will introduce a —$Z_b$— linking radical into the final molecule) are (1) 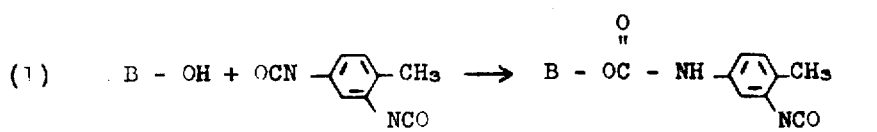

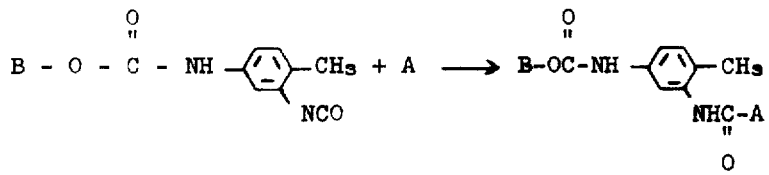

(2) 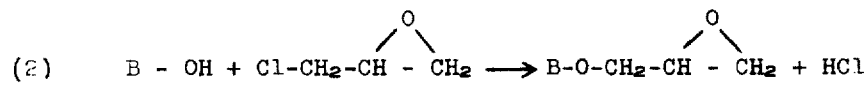

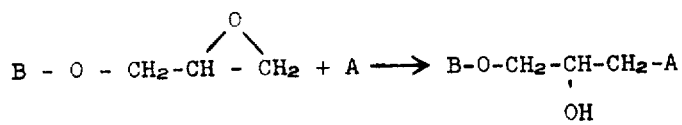

(3) 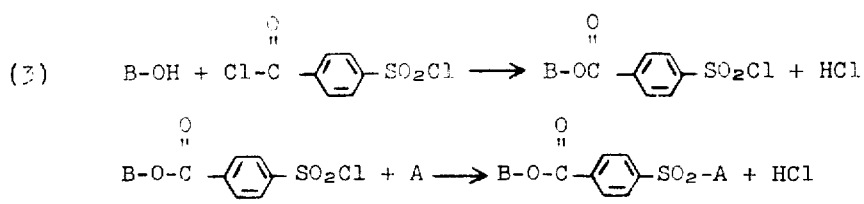

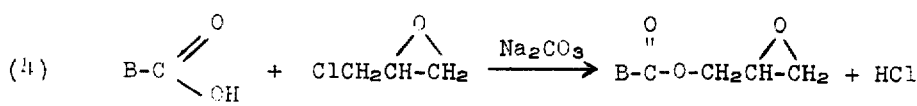

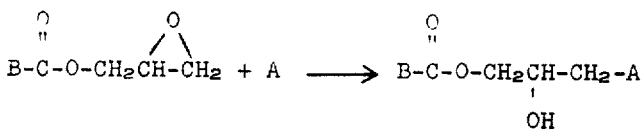

In these equations, A signifies the polyethylenimine segment and B signifies the polyester or copolyester segment.

After one of the precursors has been reacted with the linking compound, the product and the other precursor are dissolved in a mutual solvent such as toluene and refluxed for from 1 to 8 hours.

The polymer of the invention can be isolated from this reaction mass by adding a non-solvent such as methanol. The resulting precipitate is then filtered off and purified by redissolving and precipitating it several times, and then drying it at 60°–100°C. in an inert atmosphere.

The physical properties of the polymers of the invention thus prepared range from viscous liquid to friable solid. They are soluble in common organic liquids such as toluene, ethyl acetate, tetrahydrofuran, acetone, hexane, cyclohexane and dimethylformamide.

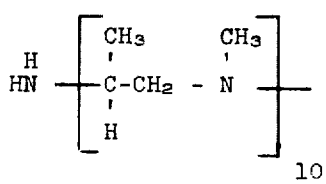

EXAMPLES

The following examples are submitted so that the invention may be more readily understood and practiced.

In the examples all parts are by weight unless otherwise indicated.

EXAMPLE 1

A flask charged with 720 parts of freshly distilled propiolactone and 7.4 parts of anhydrous n-butanol was heated at 170°C. for 15 hours and then cooled to room temperature. On cooling, the reaction product solidified.

Seventy grams of this solid were dissolved in 200 parts of anhydrous dibutyl carbitol. This solution was added to a flask containing 1.74 parts of 2,4-toluene diisocyanate and 2 drops of dibutyl tin dilaurate, heated to 100°C. for 2 hours and cooled. To this mixture were then added 20 parts of poly(N-methyl propylenimine), molecular weight 710, in 50 parts of anhydrous dimethylformamide, at room temperature.

The product, isolated by precipitation in methanol, filtering off, followed by drying at 60°C. under vacuum, had the structure

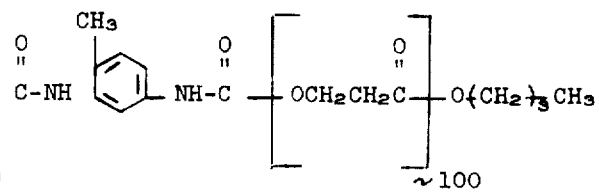

EXAMPLE 2

A flask was charged with 12 parts of poly(12-hydroxystearic acid) having an acid value of 25.3 mg. of KOH/gm. resin, 400 parts of benzene and 2.1 parts of epichlorohydrin. This solution was refluxed under nitrogen for 16 hours and cooled. Seventeen parts of triethylenetetramine were added and refluxing was continued for another 2 hours. The solution volume was reduced by evaporating the benzene on a rotating vacuum evaporator.

The resulting polymer was purified by precipitating it in methanol, filtering it off, then drying it at 60°C. under vacuum.

It had the structure

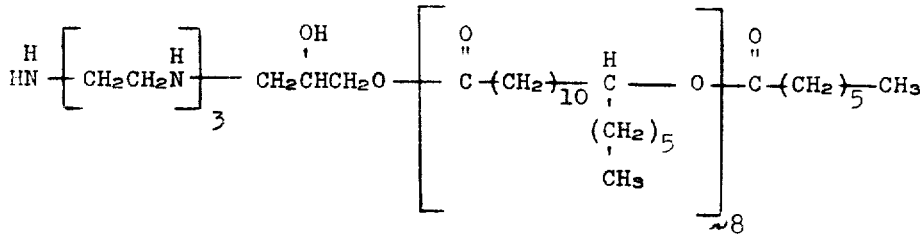

Those skilled in the art will no doubt be able to compose numerous variations on their central theme, such as the attachment of innocuous substituents. It is naturally considered that these variations are a part of the invention.

EXAMPLE 3

A solution of 200 parts of polycaprolactone (molecular weight 3000) in 465 parts of benzene was added dropwise over a two hour period to a refluxing solution of 11.6 parts of 2,4-toluenediisocyanate and 0.13 part dibutyl tin dilaurate in 100 parts of benzene.

The solution was refluxed for 30 minutes, cooled and divided into 2 equal portions.

One portion was added to 10 parts of triethylene tetramine (molecular weight 150) in 50 parts of dimethylformamide (I).

The second portion was added to 80 parts of polyethylenimine (molecular weight 1200) in 50 parts of dimethylformamide (II).

Both mixtures were stirred for 1 hour at room temperature and then precipitated in methanol. The polymers were filtered off and dried in a vacuum at 60°C.

Their structures were

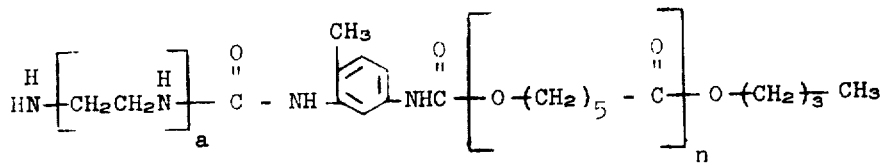

where *a* is about 3 for I and about 23 for II, and *n* is about 26.

EXAMPLE 4

A flask was charged with 100 parts of polycaprolactone (molecular weight 10,000), 1.7 parts of 2,4-toluenediisocyanate, 200 parts of toluene and 4 drops of dibutyl tin dilaurate. The solution was refluxed under anhydrous conditions for 2 hours, cooled and added dropwise, with agitation, to a solution of 10 parts of triethylenetetramine in 90 parts of anhydrous dimethylformamide.

The resulting polymer was isolated by precipitating it in methanol, filtering it off, and then drying it under vacuum at 60°C. The polymer had the structure

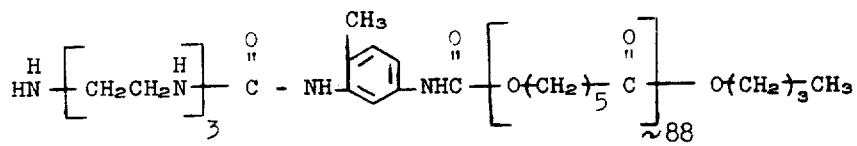

EXAMPLE 5

A flask was charged with 182.5 parts of adipic acid, 125.4 parts of propylene glycol and 61 parts of benzoic acid. This reaction mass was stirred under a carbon dioxide atmosphere at 190°–200°C. for 7½ hours (water being removed during this time) and then cooled.

Fifty parts of the resulting material were dissolved in 150 parts of xylene. Six and four-tenths parts of thionyl chloride were added and the solution refluxed for 2 hours at 70°C., under anhydrous conditions, while unreacted thionyl chloride was removed by distillation.

The solution was then cooled and 3.92 parts of tris(2-aminoethyl)amine were added, with vigorous stirring for 2 hours. The solvent was then stripped off by heating the solution to 100°C. under a pressure of 20 mm.

The resulting product had the structure

EXAMPLE 6

A mixture of

| | parts |
|---|---|
| Polyester prepolymer[1] | 1315 |
| Methylethyl ketone | 1500 |

[1]Prepared by esterifying a terephthalic acid/isophthalic acid/azelaic acid 33/17/50 mixture with ethylene glycol. The product had a hydroxyl number of 42–43.

was refluxed for one-half hour. One hundred eighty five parts of distillate were collected and discarded.

To this mixture were added, dropwise over a 15 minute period, 59.5 parts of phenyl isocyanate, followed by the addition of 5 drops of dibutyl tin dilaurate and refluxing for 2 hours.

This reaction mass was then added, dropwise over a one-half hour period, to 87 parts of toluene diisocyanate. To this were added 5 drops of dibutyl tin dilaurate, followed by 2 hours of refluxing.

This mixture was then cooled to room temperature and to it were added 73 parts of triethylene tetramine, followed by 3 hours of refluxing.

The resulting product had the structure

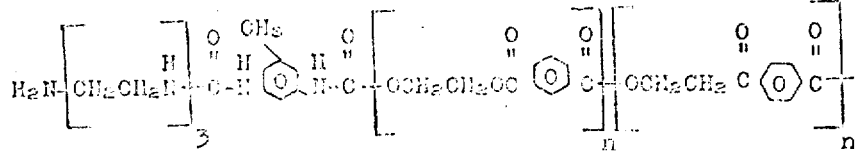

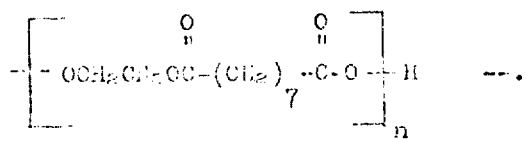

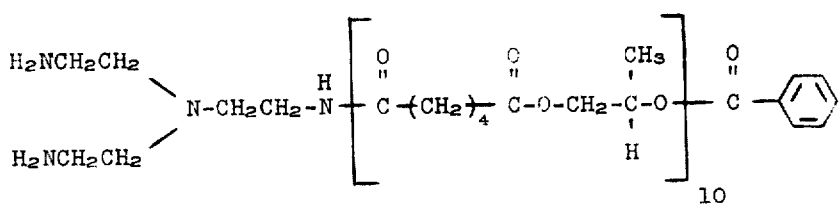

What is claimed is:
1. A polymeric material of the formula

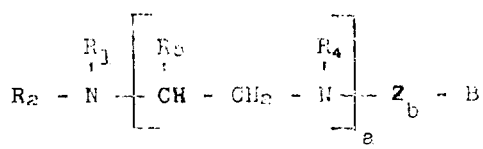

where
R₁, R₂ and R₄ are hydrogen, alkyl radicals of 1 through 4 carbon atoms, —CH₂CH₂NH₂, or —CH₂CH₂OH;
R₃ is hydrogen or an alkyl radical of 1 through 4 carbon atoms;

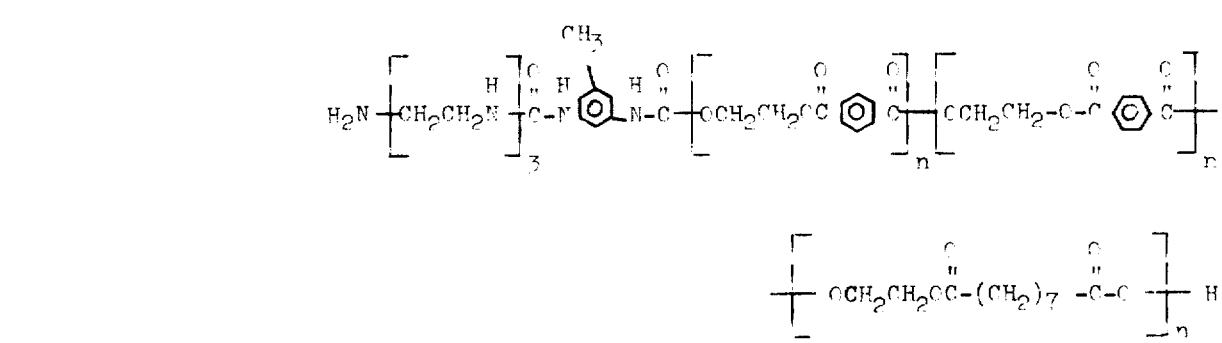

$Z_{(b)}$ is a dicarbamoyl radical;
B is a lactone, dicarboxylic acid/diol or hydroxycarboxylic acid polyester or copolyester segment;
a is a number 1 through 2000; and
b is 1.
2. The polymeric material of claim 1 having the formula

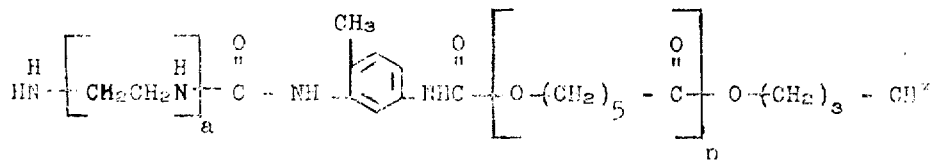

where a is 3 or 23 and n is about 26.
3. The polymeric material of claim 1 wherein B is a polyester segment prepared by esterifying a terephthalic acid-isophthalic acid-azelaic acid 33:17:50 mixture with ethylene glycol having a hydroxyl number of 42–43.

* * * * *